United States Patent [19]

Kakigi et al.

[11] 4,249,082

[45] Feb. 3, 1981

[54] PHOTOELECTRIC SMOKE SENSOR BOX

[75] Inventors: Yasugi Kakigi; Takao Kakigi, both of Tokyo, Japan

[73] Assignee: Cybernet Electronics Corporation, Kawasaki, Japan

[21] Appl. No.: 943,620

[22] Filed: Sep. 19, 1978

[30] Foreign Application Priority Data

Sep. 20, 1977 [JP] Japan .......................... 52/126611[U]
Oct. 17, 1977 [JP] Japan .......................... 52/138824[U]

[51] Int. Cl.[3] .............................................. G01N 15/06
[52] U.S. Cl. ...................................... 250/574; 250/239
[58] Field of Search ........................ 356/338, 342, 343; 290/574, 575, 239; 340/630

[56] References Cited

U.S. PATENT DOCUMENTS

| | | | |
|---|---|---|---|
| 3,863,076 | 1/1975 | Steele et al. . | |
| 3,868,184 | 2/1975 | Marsocci . | |
| 3,916,209 | 10/1975 | Steele et al. . | |
| 3,917,956 | 11/1975 | Malinowski . | |
| 3,936,814 | 2/1976 | Muller-Girard et al. | 250/574 |
| 4,099,065 | 7/1978 | Malinowski | 250/574 |
| 4,099,178 | 7/1978 | Ranney et al. | 340/630 |
| 4,129,383 | 12/1978 | Malinowski | 356/338 |
| 4,166,698 | 9/1979 | Steele | 250/574 |

*Primary Examiner*—David C. Nelms
*Attorney, Agent, or Firm*—Oblon, Fisher, Spivak, McClelland & Maier

[57] ABSTRACT

A photoelectric smoke sensing chamber in a smoke sensing blind box which comprises a cylindrical body having inner and outer walls with vertical openings with both ends of the cylindrical body closed, the chamber being characterized by inner and outer walls fixed into an annular base and upwardly extended to the ceiling of the cylindrical body; a support for a luminous element and a light receiving element, which support is sealingly fitted into the inner edge of the annular base; light shading projections radially extended from at least one portion of the inner surface in full length of each of the inner and outer shell members; and a scattered light weakening layer formed at least on the inner surface of the cylindrical body for weakening scattered light occurring due to the reflection of the beam from the luminous element. The smoke sensing chamber is capable of preventing scattered light from entering the same from the outside, weakening the reflection and scattering of the beam from the luminous element in the chamber, maintaining a high smoke sensing ability, reducing the consumption of electric power, and preventing an erroneous alarm from being given.

8 Claims, 12 Drawing Figures

PHOTOELECTRIC SMOKE SENSOR BOX

BACKGROUND OF THE INVENTION

1. Field of the Invention

The present invention relates to a smoke sensing chamber in a photoelectric smoke sensor having a large opening for easily introducing smoke thereinto, which permits preventing light from entering the chamber from the outside, preventing a decrease in SN ratio due to the reflection of the light beam from a luminous element provided in the chamber, and reducing the consumption of electric power of a detection circuit; and a smoke sensor box which can be combined with the smoke sensing chamber and which is of a simple construction permitting an accurate mounting of a luminous element and a light receiving element thereon.

2. Description of the Prior Art

A smoke sensing blind box used to photoelectrically detect smoke and give an alarm for a fire and consisting of a cylindrical body having inner and outer walls has been known. The cylindrical body is closed at both ends thereof and the slits in the inner walls and those in the outer wall are so arranged that the former are not in alignment with the latter.

In order to easily introduce smoke into a blind box, many slits may be provided in the walls thereof. However, a blind box with many slits in the walls thereof may allow the light to enter the same from the outside to cause an erroneous alarm. A structure having simple double walls may not give a solution to the problem of effecting at once the facilitating of introduction of smoke and the prevention of entry of light from the outside. This causes contradictory results.

When the number of slits in the outer and inner walls is increased while widening the gap between the outer and inner walls to increase the total area of the openings in the cylindrical body, the amount of smoke flowing thereinto may be surely increased but the incident angle of the light advancing into the blind box may be decreased. Then, even when the slits in the outer wall and the slits in the inner wall are so arranged that the former are not in alignment with the latter, much more light may enter the blind box. In order to eliminate the inconvenience, it is necessary that the dimensions of the blind box be increased limitlessly and that the sensitivity of the detection circuit be reduced beforehand to such an extent that corresponds to the amount of scattered light entering the blind box from the outside. Consequently, smoke cannot be detected at a high accuracy with a small consumption of electric power.

In a device for sensing smoke with a sensor provided in a smoke collecting chamber thereof, which smoke is introduced into the chamber when a fire occurs, a light receiving element senses irregularly reflected scattered light occurring when the light from a luminous element impinges upon the particles of smoke. A sensor portion including a luminous element and a light receiving element in such a device is generally provided in a groove formed in the bottom portion of the smoke collecting chamber, and the sensor and chamber are integrally molded. Therefore, it is troublesome to mount the luminous element and light receiving element in the groove. These elements may not be fixed in a predetermined position, and it is troublesome to adjust the position thereof. Thus, a large number of assembling steps are required.

SUMMARY OF THE INVENTION

An object of the present invention is to provide a smoke sensor of small dimensions having a smoke collecting chamber defined by double walls and extremely widened openings for smoke, and capable of preventing scattered light from entering the chamber from the outside, weakening the reflection and scattering of the beam from a luminous element in the chamber, maintaining a high smoke sensing capability, reducing the consumption of electric power, and preventing an erroneous alarm from being given.

Another object of the present invention is to provide a smoke sensor box of a simple construction which can be assembled by an understandable procedure without using any jigs and supporting parts.

Still another object of the present invention is to provide a smoke sensor box having a support for a luminous element and a light receiving element which can be mounted therein by a mere inserting step; and a spring for an inspection rod for testing the performance of the device, which spring can be provided within the support without obstructing the path of the beam from the luminous element and onto the light receiving element, the support being sealingly fitted into the bottom portion of the smoke collecting chamber.

To these ends, the present invention provides a photoelectric smoke sensing chamber in a smoke sensing blind box which comprises a cylindrical body having inner and outer walls with vertical openings with both ends of the cylindrical body closed, the chamber being characterized by inner and outer shell members which constitute the inner and outer walls fixed into an annular base and upwardly extended to the ceiling of the cylindrical body; a support for a luminous element and a light receiving element, which support is sealingly fitted into the inner edge of the annular base; light shading projections radially extended from at least one portion of the ineer surface in full length of each of the inner and outer shell members; and a scattered light weakening layer formed at least on the inner surface of the cylindrical body for weakening scattered light occurring due to the reflection of the beam from the luminous element.

The above and other objects as well as advantageous features of the invention will become apparent from the following description of the preferred embodiments taken in conjunction with the accompanying drawings.

BRIEF DESCRIPTION OF THE DRAWINGS

FIG. 1(*b*) is an enlarged fragmentary cross-sectional view of a scattered light weakening layer formed on the inner surface of the chamber shown in FIG. 1(*a*);

FIG. 4(*b*) is a side elevational view of the light receiving element;

FIG. 9(*b*) is a side elevational view taken in the direction of an arrow shown in FIG. 7.

DESCRIPTION OF THE PREFERRED EMBODIMENTS

An embodiment of the present invention will be described with reference to the accompanying drawings.

Figure 1A:
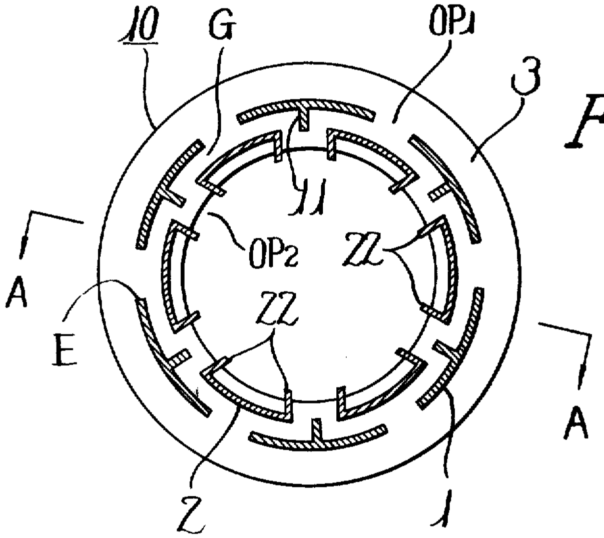
FIG. 1(*a*) is a horizontal cross-sectional view of the smoke sensing chamber according to the present invention, taken along line B—B in FIG. 2.
Figure 1B:
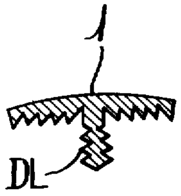
Figure 2:
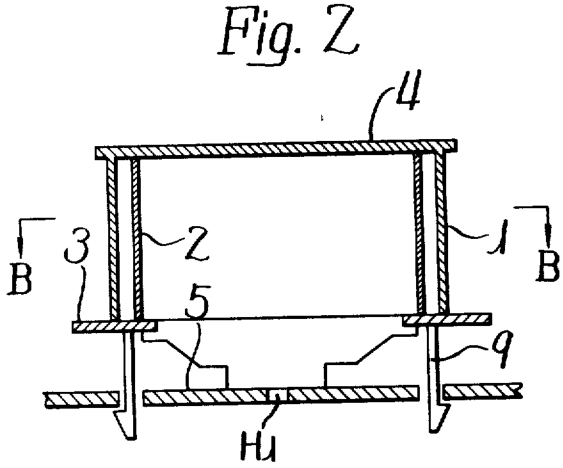
FIG. 2 is a side elevational view in cross section of the chamber shown in FIG. 1(*a*), taken along line A—A in FIG. 1(*a*)

FIG. 1(*a*) is a cross-sectional view taken along the line B—B in FIG. 2 which is a side elevational view in cross section of a cylinder 10.

Referring to FIG. 1, reference numeral 1 denotes outer shell members forming an outer wall and reference numeral 11 denotes light shading projections or baffles inwardly extended from the inner surfaces of the outer shell members or wall sections 1. Reference numeral 2 denotes inner shell members spaced from the outer shell members to form an inner wall or wall sections and reference numeral 22 denotes light shading projections or baffles inwardly extended from both ends of each of the inner shell members. The thickness of the projections 22 may be identical with the length thereof. The outer and inner shell members 1, 2 are set up on an annular base 3 so that they are regularly spaced in the circular direction to form gaps or openings OP1, OP2 thereamong.

FIG. 2 is a vertical cross-sectional view taken along the line A—A in FIG. 1.

Referring to FIG. 2, reference numeral 4 denotes a ceiling or end wall fixed on the upper ends of the outer and inner walls and reference numeral 9 fixing legs downwardly extended from the rear surface of the base 3. The legs 9 may be secured with other parts to, for example, a printed board 5.

Figure 3:
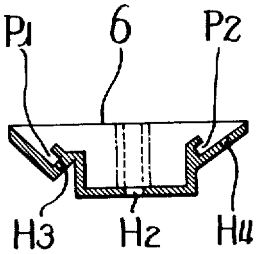
FIG. 3 is a side elevational view in cross section of a support (sensor box) for a luminous element and a light receiving element.
Figure 4A:
FIG. 4(*a*) a side elevational view of the luminous element.
Figure 4B:
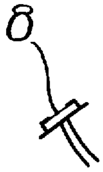

FIG. 3 is a vertical cross-sectional view of a support 6 for luminous element and a light receiving element. The support 6 has an outwardly diverged wall which is provided in the inner surface thereof with a luminous element retaining portion P1 and a light receiving element retaining portion P2. A luminous element 7 shown in FIG. 4(*a*) is inserted in the retaining portion P1 while passing its lead wires through a hole H3. A light receiving element 8 shown in FIG. 4(*b*) is inserted in the retaining portion P2 while passing its lead wires through a hole H4. The space defined by the base 3 and printed board 5 of the cylinder 10 is sealed with the frusto-conical support 6 which is fitted tightly into the circular inner edge of the base 3.

Referring to FIGS. 2 and 3, reference symbols H1, H2 denote holes through which an inspection rod is to be inserted to simply inspect the smoke sensor with respect to the luminous beam.

The prevention of entry of light from the outside into the above-described structure will be described.

Referring to FIG. 1(*a*), the cylinder 10 must be protected against even such scattered light that advances from the outside thereof through a gap OP1 of two adjacent outer shell members 1 toward one end E of one of the adjacent outer shell members 1 at a small angle to the outer surface thereof. Such a type of scattered light is first reflected upon the light shading projection 11 extended from the inner surface of the shell member 1 and it then advances toward one of the light shading projections 22 of an inner shell member 2 which is opposed to the gap OP1. At the projection 22, the scattered light is prevented from entering the inside of the cylinder 10 as it is thereby weakened.

In order to increase the surface area of the light shading projections, it is necessary to increase the number of the outer and inner shell members while keeping the construction and arrangement thereof identical with those shown in FIG. 1(*a*). Increasing the surface area of the light shading projections is one of the methods of effectively preventing the entry of light into the cylinder 10 and also helps in easily introducing smoke thereinto.

In order that the beam from a luminous element in the bottom portion of a smoke collecting chamber impinging upon a certain portion of the inner surface of the cylinder 1 and reflected several times therein may not be sensed by the light receiving element, a cross-sectionally surated or saw-teeth-shaped light weakening layer DL as shown in FIG. 1(*b*) may be formed in the inner surfaces of the outer shell members 1. This allows the light reflected several times in the chamber to be weakened and substantially destroyed before it has reached the light receiving element. This light weakening layer DL can be integrally molded with the chamber or it can be formed by pasting sheet materials on the outer shell members 1.

In a structure in which the light from the outside thereof or the scattered light within the chamber has influence upon the light receiving element, it is necessary to decrease the sensitivity of the light receiving element and increase the illumination of the luminous element. Consequently, the consumption of electric power is naturally increased.

According to the present invention, the influence of the light from the outside and scattered light within the chamber upon the light receiving element can be neglected. The smoke sensor according to the present invention has a high sensitivity and generates a pulse type beam. In this smoke sensor, the circuit for the pulse type beam referred to above is combined with a light receiving circuit, amplifying circuit, and warning circuit which are synchronized therewith and then, it permits reducing the consumption of electric power.

Figure 5:
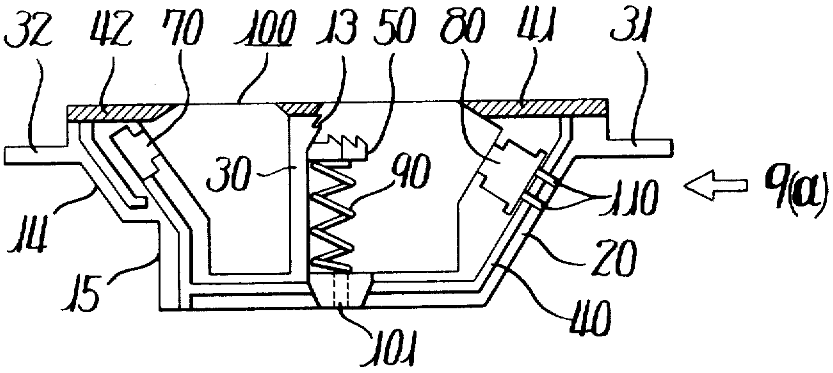
FIGS. 5 and 7 are side elevational views in cross section of two comlementary units which are to be joined together to form a sensor box taken along lines 0—0 in FIG. 5, and lines 0′—0′ in FIG. 8, respectively.
Figure 6:
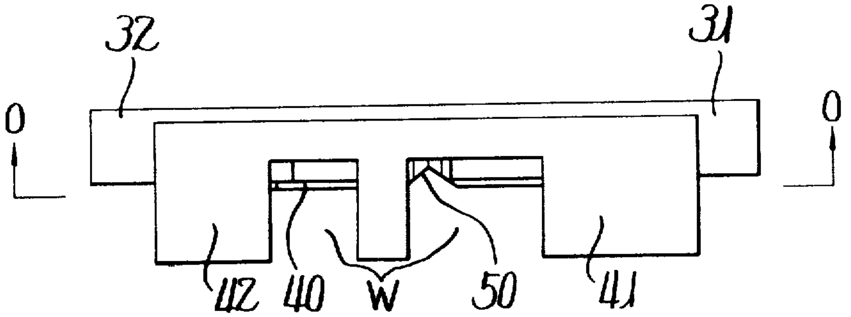
FIG. 6 is a top plan view of the unit shown in FIG. 5.
Figure 7:
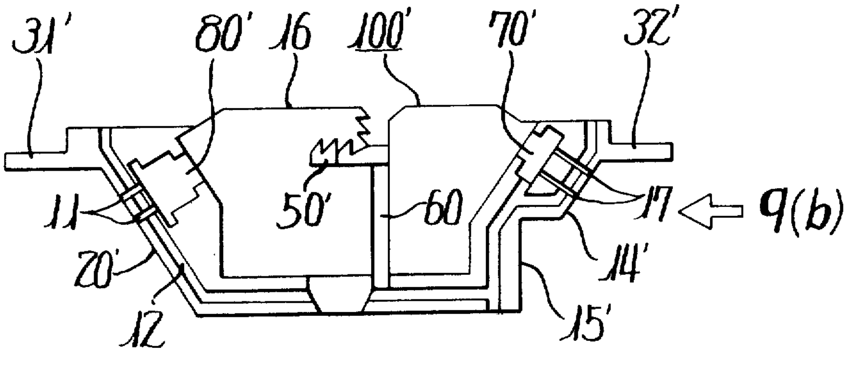

FIGS. 5 and 7 are side elevational views of cut surfaces of two complementary units 100, 100′ which are combined with each other at the cut surfaces to form a box having hollow spaces therein. These side elevational views are taken along the lines 0—0 and 0′—0′ in FIGS. 6 and 8 which are plan views of the units 100, 100′.

Figures 9A, 9B:
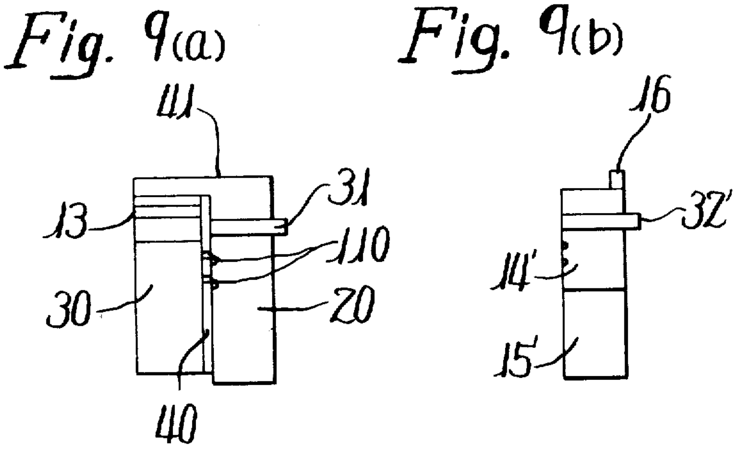
FIG. 9(*a*) is a side elevational view taken in the direction of an arrow shown in FIG. 5.

FIGS. 9(*a*) and 9(*b*) are side elevational views of the units shown in FIGS. 5 and 7, respectively, and they are taken in the direction of arrows shown in FIGS. 5 and 7.

Referring to FIGS. 5-9(*b*), reference numeral 30 denotes a partition wall whereby a smoke sensor box is divided into two units. The partition wall 30 is extended to the upper surface of a top wall 41 or 42 and disposed in a position where the path of beam advancing from a luminous element fitted in a recess 70 to a light receiving element fitted in a recess 80 is not thereby obstructed.

Reference numeral 40 denotes a linear projection or rib upwardly extended at the cut surface of the unit 100; 50 a stop for a spring 90, which stop 50 is horizontally extended from the partition wall 30; 101 a hole through which an inspection rod (not shown) is to be slidingly moved; 110 holes through which the lead wires of the luminous element are passed; and 31, 32 hinges.

The unit 100′ shown in FIG. 7 is another member of the smoke sensor box having a recess or channel 12 in which the projection 40 of the above-mentioned unit 100 shown in FIG. 5 is to be fitted.

Reference numeral 60 denotes a slit in which the partition wall 30 is fitted when the units 100, 100″ are joined together at their cut surfaces. At this time, the slit 60 is sealed with the partition wall 30 in full thickness and length, and the ends of cover portions 41, 42 shown in FIG. 6 of the unit 100 are extended to the upper surface of a side wall 16 of the unit 100′ to close the same.

Reference symbol W denotes passages for light through which a beam from the luminous element to the upper cover and an incident beam reflected thereupon to the light receiving element are passed. The upper end portion of the combined units is opened so wide that it is fitted into the bottom portion of the smoke collecting chamber (FIG. 2), and the light is radiated to the particles of smoke in the chamber to allow the light reflected thereupon to be received by the light receiving element. The inspection rod is used instead of particles of smoke to test the device with respect to the scatter of light reflected thereupon. Namely, the inspection rod is provided to inspect the performances of the smoke collecting chamber having a smoke sensor according to the present invention and a photoelectric converter and a warning means electrically connected thereto. The inspection rod is supported by the spring 90 utilizing the space in the smoke sensor box. Then, the dimensions of the smoke sensor box can be reduced and the box can be easily assembled.

The partition wall 30 and the stop 50 for the inspection rod supporting spring 90 has a scattered light weakening layer thereon, for example, a saw-teeth like surface as shown in FIGS. 5 and 7, whereby the influence of irregularly reflected scattered light occuring in the smoke collecting chamber upon the light receiving element is prevented. The spring 90 may be sufficient if it is resilient enought to allow the end of the inspection rod to go into the path of beam when the former is compressed by the latter inserted in the hole in the bottom portion of the smoke collecting chamber.

Figure 8:
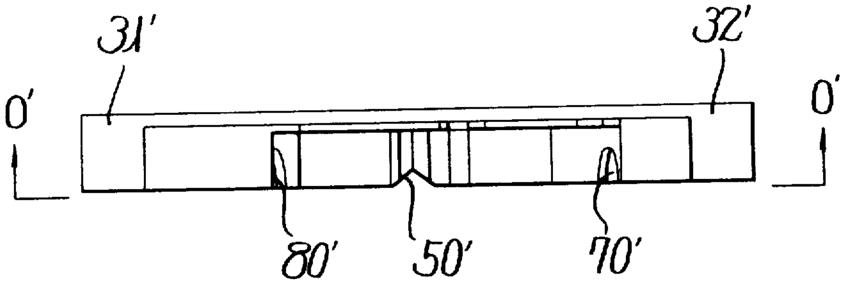
FIG. 8 is a top plan view of the unit shown in FIG. 7.

For example, the inspection rod, not shown, would be inserted through hole 101 and thence upwardly through coil spring 90 and through the opening provided by the mating notches in the stop 50 (see FIGS. 6 and 8). A suitable detent, such as a collar or the like, would be on the rod for engagement with the lower end of spring 90 so that the spring would normally urge the rod downwardly.

The procedure of assembling the smoke sensor box of the above-described construction will be described.

In recesses in either one of the complementary units, a luminous element and a light receiving element are fitted. An inspection rod passed through the spring is disposed along the partition wall so that the upper end of the spring is urged against the stop therefor. The other complementary unit is superimposed on the resulting unit so that a projection and a recess provided on and in the corresponding portions of the cut surfaces permit the inspection rod to be passed therethrough. The sensor portion, which is a very important portion of a smoke sensor, and which is made of complementary units may then be compactly assembled at a high accuracy. The sensor box or portion is secured to the smoke chamber housing as indicated diagrammatically in FIG. 2.

Consequently, the sensor box according to the present invention may be efficiently made. It has a high quality and requires no adjustments. Then, it contributes much to the quantity production thereof.

The present invention provides a chamber having a sensor, which can be installed in the vicinity of lighting fixtures or on the ceilings and walls of buildings.

The present invention is not, of course, limited to the above embodiment; it may be modified in various ways within the scope of the appended claims.

What is claimed is:

1. A smoke detector housing for a photoelectric smoke detector, comprising:

a housing structure including sidewalls, an end wall and an annular base with a central opening therethrough, defining a smoke chamber, said side walls having openings therethrough for permitting entry of smoke into the chamber but blocking incident light therefrom; and a sensor box sealingly fitted into the central opening of the annular base for supporting a light source and light detected means in a position having fields of view through the central opening and intersecting in the chamber;

said sensor box comprising two mating half portions with interfitting projection and recess means on confronting peripheral edge surfaces thereof, said half portions each having recesses therein to support a light source and a light detecting means in said positions, one of said half portions having a top wall extending toward and into sealing contact with the other half portion, said top wall having a pair of spaced openings therethrough in registry with the respective fields of view of the light source and light detecting means, said interfitting projection and recess means defining end walls and a bottom wall, a partition wall extending transversely between the half portions between the light source and light detecting means to prevent light from passing through the interior of the sensor box directly to the light detecting means, a spring stop formed in the sensor box at the partition wall, a spring in the sensor box engaged with the stop, and an opening in the bottom wall of the sensor box for receiving a test rod therethrough for insertion into the fields of view of the light source and light detecting means to simulate the presence of smoke particles, the spring engaging the test rod to normally urge it to a position out of the field of view of the light source and light detecting means.

2. A smoke detector housing as in claim 1, wherein:

said stop is between the top wall and bottom wall; and said spring is a coil spring engaged between the stop and bottom wall.

3. A smoke detector housing as in claim 2, wherein:

said spring stop comprises mating projections integral with said mating half portions and extending toward and into contact with one another; said projections having mating notches therein defining a guide opening through which an inspection rod can be extended, and said coil spring being disposed around an inspection rod when the rod is inserted into the housing.

4. A smoke detector housing as in claim 3, wherein:

the spring stop has a serrated surface thereon to diffuse light striking the stop.

5. A smoke detector housing as in claim 1, or claim 2 or claim 3 or claim 4, wherein:

the end walls are outwardly divergent toward the top wall and have apertures therethrough for receiving electrical leads for a light source and light detecting means received in the recesses in the half portions, said divergent end walls and the recesses supporting the light source and light detecting means in angular positions so that the fields of view thereof are pointed across the partition wall for intersection in the chamber.

6. A smoke detector housing as in claim 1 or claim 4, wherein:

the housing structure sidewalls comprise an inner wall and an outer wall spaced radially therefrom, said walls having openings therethrough, with the openings in the outer wall circumferentially offset from the openings in the inner wall, and radially inwardly projecting baffles on the inner surfaces of the inner and outer walls in association with the openings to permit ready entry of smoke into the chamber but blocking entry of incident light thereinto.

7. A smoke detector housing as in claim 6, wherein:

the outer wall comprises a plurality of circumferentially spaced apart sections defining the openings therebetween, and the inner wall similarly comprises a plurality of circumferentially spaced apart sections defining the openings therebetween;

said baffles on the inner surface of the outer wall comprise a baffle at approximately the inner portion of each section, said baffles projecting into the middle of an adjacent opening in the inner wall; and said baffles on the inner surface of the inner wall comprise a baffle at each of the opposite side edges of each wall section, said baffles on the inner and outer walls preventing incident light from shining directly into the chamber.

8. A smoke detector housing as in claim 7, wherein:

light diffusing serrations are formed on the baffles and inner surfaces of the wall sections.

* * * * *